(12) United States Patent
Warnke

(10) Patent No.: US 7,056,069 B1
(45) Date of Patent: Jun. 6, 2006

(54) METHOD AND APPARATUS FOR INSTALLING BARRIER MATERIAL

(75) Inventor: David R. Warnke, Stover, MO (US)

(73) Assignee: Warnkez, LLC, Stover, MO (US)

( * ) Notice: Subject to any disclaimer, the term of this patent is extended or adjusted under 35 U.S.C. 154(b) by 0 days.

(21) Appl. No.: 11/103,774

(22) Filed: Apr. 12, 2005

(51) Int. Cl.
*E02D 17/20* (2006.01)

(52) U.S. Cl. ............... 405/302.7; 405/303; 405/15

(58) Field of Classification Search ........... 405/302.7, 405/302.6, 302.4, 268, 270, 15, 303
See application file for complete search history.

(56) References Cited

U.S. PATENT DOCUMENTS

| | | | |
|---|---|---|---|
| 3,182,459 A | * | 5/1965 | Grether et al. ............. 405/270 |
| 3,722,861 A | | 3/1973 | Anderson |
| 4,339,096 A | | 7/1982 | May |
| 4,720,212 A | * | 1/1988 | Steenbergen et al. ....... 405/270 |
| 4,732,227 A | | 3/1988 | Wolf et al. |
| 4,929,126 A | * | 5/1990 | Steenbergen et al. ....... 405/267 |
| 5,039,250 A | | 8/1991 | Janz |
| 5,421,118 A | | 6/1995 | Bauer |
| 5,685,668 A | * | 11/1997 | Justice ..................... 405/270 |
| 5,915,878 A | | 6/1999 | Carpenter |
| 6,053,665 A | | 4/2000 | Richardson |
| 6,158,923 A | | 12/2000 | Wheeler et al. |
| 6,360,984 B1 | | 3/2002 | England |
| 6,517,294 B1 | | 2/2003 | Vreeland |

* cited by examiner

*Primary Examiner*—Frederick L. Lagman
(74) *Attorney, Agent, or Firm*—Husch & Eppenberger LLC; Grant D. Kang

(57) ABSTRACT

A farm implement for guiding a barrier material into a layered material comprises a turntable for holding the barrier material, a guide apparatus for guiding the barrier material into the layered material, and a crossbar to which is attached the turntable and a hitch portion for attaching the crossbar to a vehicle. The guide apparatus comprises a vertical support post that attaches the guide apparatus to the crossbar, a guide slot hingedly attached to the vertical support post, a platform and at least one roller attached to the guide slot, and at least one cap hingedly attached to and positioned above the guide slot.

21 Claims, 9 Drawing Sheets

METHOD AND APPARATUS FOR INSTALLING BARRIER MATERIAL

CROSS-REFERENCE TO RELATED APPLICATIONS

None.

BACKGROUND OF THE INVENTION

1. Field of the Invention

The present invention relates to farm implements and methods in general and in particular to a method and apparatus for installing fencing or other barrier or confinement materials below the surface of, for example a litter pile, for raising animals therein.

2. Background

Large scale poultry farming requires large enclosures for containing the hatchlings in order to keep them confined, which at early stages is important for keeping them near a source of heat and at all stages is important for the birds' protection. Typically these enclosures are placed in a fresh bed of litter, which must be replaced after each batch of birds has been raised.

The litter can be comprised of a variety of materials and arranged in various ways. Often the bottom layer of litter is composed of a water-absorbent material, which is important for containing wastes and keeping the birds dry and clean. This absorbent material may be a natural material which is relatively inexpensive to obtain and relatively harmless to the birds.

Many growers use waste material from a variety of natural sources, for example hulls generated during the production of white rice, as a base for their litter. While rice hulls have many other beneficial properties such as water absorbency, they are nonetheless potentially dangerous to the health of the birds. If a chicken or turkey poult swallows a piece of hull the material can get stuck in the bird's crop and if not dislodged can lead to the bird's death. Therefore, the bottom layer of rice hulls (or other base material) is overlaid with layers of other, less harmful materials such as wood chips, wood shavings, or straw.

When barriers are installed in the barn or pen to create discrete brooding pens for the poults, care must be taken not to disturb the layers of material so as avoid turning up to the surface any materials (such as rice hulls) from lower layers that could be a danger to the birds. The extra care that must be taken during installation of temporary barriers for confining the birds (or other animals) while they are being raised makes manual installation of the barriers difficult and time-consuming. Even where no dangerous materials are used, manually installing a barrier in the litter pile is still a laborious process that can consume a great deal of time.

More generally, installing a barrier material into a layered material can be cumbersome and time-consuming, especially when care must be taken not to mix or disturb the various layers involved. One such example is the installation of lawn or garden edging materials, wherein one must avoid spilling dirt onto the adjoining grass or pavement.

SUMMARY OF THE INVENTION

The object of this invention, therefore, is to provide a method and apparatus for installing a barrier in a litter pile or any other layered surface.

In one embodiment the invention is a guide apparatus for guiding a barrier material into a layered material, where the guide apparatus comprises a guide slot having solid walls; and at least one cap, positioned over the guide slot and arranged to generate downward force on the barrier material as the barrier material is guided through the guide slot.

In another embodiment the invention is a method of inserting a barrier material into a layered material, comprising the steps of providing a guide apparatus comprising a guide slot having solid walls and an open rear portion and at least one cap, the cap being positioned over the guide slot and arranged to generate downward force on the barrier material as the barrier material is guided through the guide slot; advancing the guide apparatus through the layered material; guiding the barrier material through the guide slot; and extruding the barrier material through the open rear portion of the guide apparatus into the layered material.

In yet another embodiment the invention is a farm implement for guiding a barrier material into a layered material, the farm implement comprising a turntable for holding the barrier material; a guide apparatus for guiding the barrier material into the layered material, the guide apparatus comprising a vertical support post, a guide slot hingedly attached to the vertical support post, a platform and at least one roller attached to the guide slot, and at least one cap hingedly attached to and positioned above the guide slot, and a crossbar to which is attached the turntable and the vertical support post of the guide apparatus, the crossbar further comprising a hitch portion for attaching the crossbar to a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
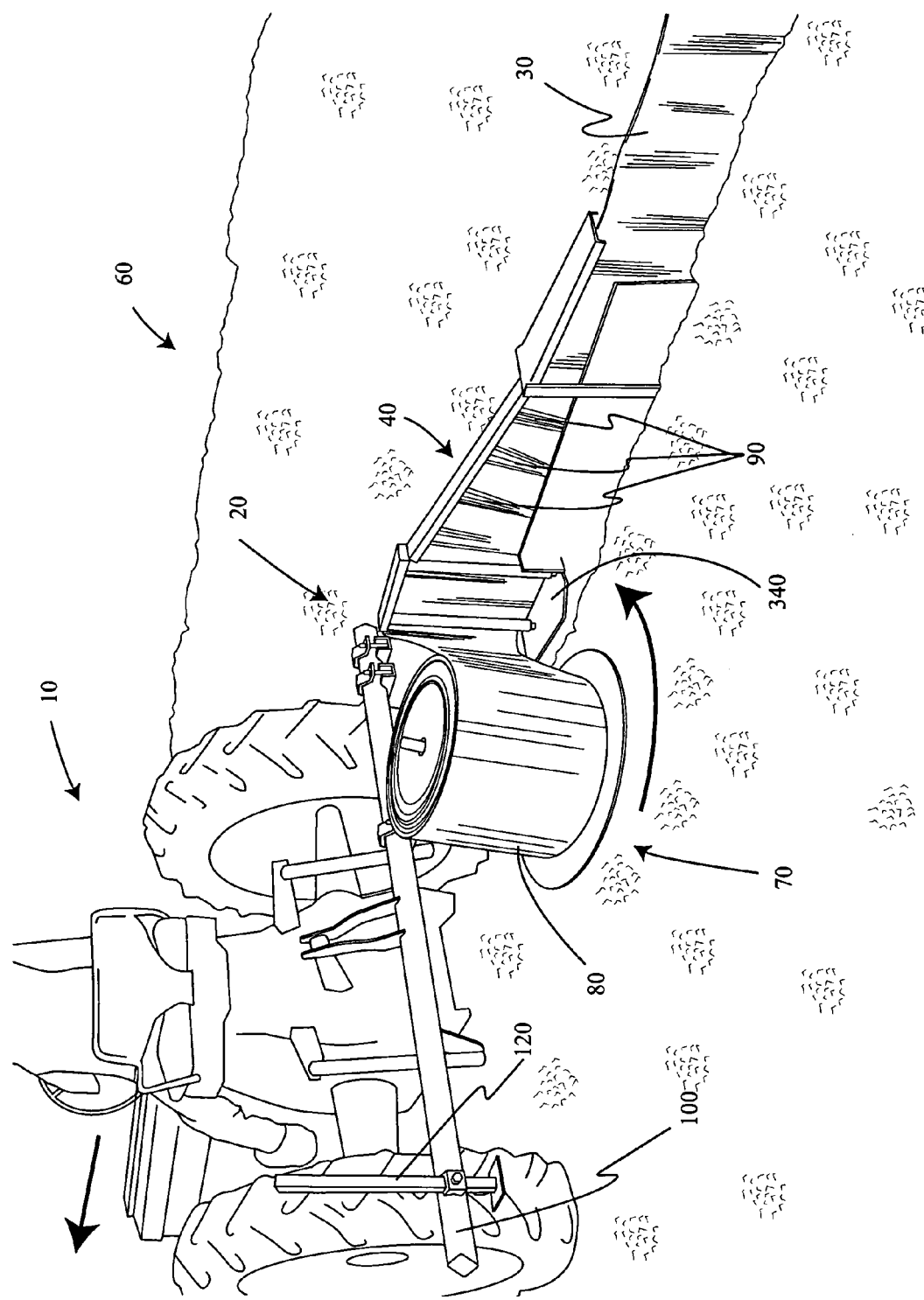
FIG. 1 shows a perspective view of one embodiment of the invention while attached to a tractor and while being used to install barrier material.

FIG. 1 shows a tractor 10 pulling one embodiment of a brooder guard plow 20 while installing barrier material 30. This embodiment, and the device in general, is referred to as a "brooder guard plow" to reflect the fact that this particular embodiment of the invention has been developed for installation of cardboard barriers referred to as "brooder guards" into layers of litter 60, wherein the device "plows" through the litter layers as it guides the barrier material into place. Nonetheless the general principles described herein may be used in a variety of settings to install fencing or other barriers into layered material which might also include earth. In still another embodiment the base surface is a layer of relatively loose material such as sand or silt. Brooder guard plow 20 collectively refers to a guide apparatus 40 for guiding barrier material 30 into layered litter 60, a turntable 70 for holding and dispensing barrier material 30, a crossbar 100 for supporting the various parts and attaching to tractor 10, and an adjustable stand 120 for supporting brooder guard plow 20 when it is not attached to tractor 10 or other vehicle.

Brooder guard plow 20 is designed to create a narrow furrow as it moves along, into which the desired barrier material 30 is inserted from the back end of a guide apparatus 40. Guide apparatus 40 consists of an elongated slot through which barrier material 30 is fed as barrier material 30 is gradually bent, so that it ends up parallel to a base surface 50 (FIG. 4) on which it is laid. Base surface 50 in one embodiment is a concrete barn floor on which litter material 60 is layered, and in other embodiments base surface 50 is earth. Barrier material 30 is preferably carried along with guide apparatus 40, preferably on a rotating turntable 70 that permits smooth feeding of barrier material 30 through guide apparatus 40.

Arrows in FIG. 1 suggest the forward movement (straight arrow) of tractor 10 and the concomitant rotational movement (curved arrow) of a roll 80 of barrier material 30 on turntable 70. As barrier material 30 moves through guide apparatus 40, barrier material 30 is bent slightly in a vertical direction as it makes a transition from being above litter 60 and tilted relative to the level of base surface 50 to being below litter 60 and parallel to base surface 50. This transition generally induces ruffles 90 in barrier material 30, with these ruffles 90 being greater near the upper edge of barrier material 30. Guide apparatus 40 must be long enough for barrier material 30 to make a sufficiently gradual transition before coming to rest on base surface 50. In one embodiment using eighteen inch wide corrugated cardboard, the guide slot portion (described below) of guide apparatus 40 is approximately five and a half feet long.

Figure 2:
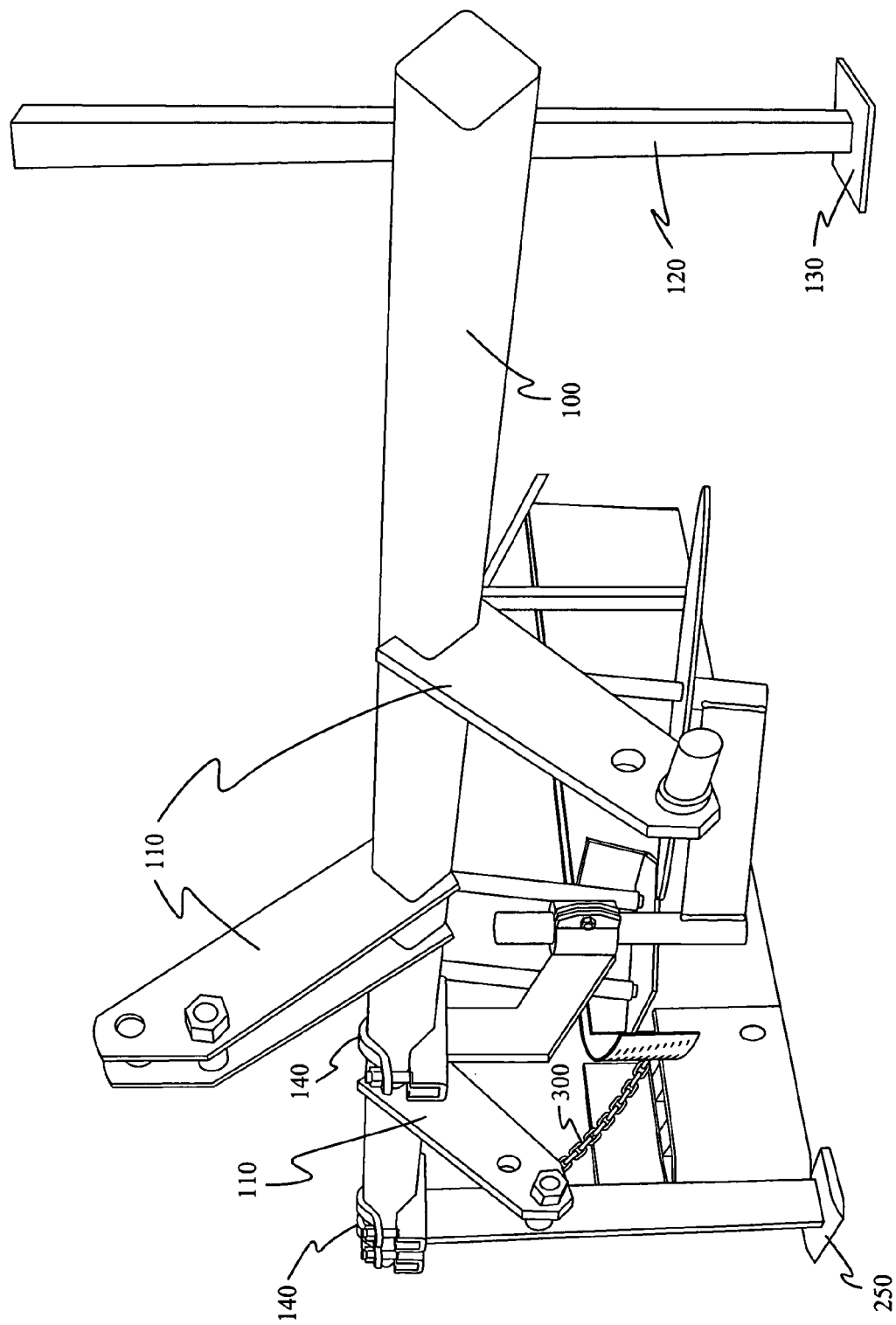
FIG. 2 shows a perspective view of an embodiment of the invention, showing a crossbar to which is attached hardware for installing to a three-point hitch, a stand (right) for holding the device steady when not attached to a tractor, near the center a turntable that holds a roll of material, and in the background a guide apparatus attached to the far end of the crossbar.

Guide apparatus 40 and turntable 70, in one embodiment, are mounted on a crossbar 100 that is adapted to be attached to tractor 10, e.g. using a standard three-point tractor hitch 110 (FIG. 2). However, this is only one embodiment and other means of driving guide apparatus 40 and turntable 70 are encompassed within this invention, including mounting guide apparatus on the front or side of a vehicle. Furthermore, in the case where tractor 10 is the means by which guide apparatus 40 and turntable 70 are driven, other types of hitches and coupling mechanisms may be used without deviating from the invention. In a preferred embodiment, crossbar 100 has a non-circular cross-section such as a square to allow more secure attachment of the various components, without the clamps holding the components inadvertently rotating and thus misaligning the components.

In a preferred embodiment guide apparatus 40 and turntable 70 are attached to crossbar 100 as shown in FIG. 1. Crossbar 100, in turn, can be moved up and down, e.g. by a hydraulic system that is part of tractor 10 or other vehicle to which brooder guard plow 20 is attached, to permit the height of guide apparatus 40 to be adjusted relative to base surface 50. Other means of carrying barrier material 30 and feeding it into guide apparatus 40, such as from an adjoining vehicle, are also encompassed within this invention.

In one embodiment, shown in the foreground on the right of FIG. 2, crossbar 100 includes an adjustable stand 120, which is useful for allowing brooder guard plow 20 to stand on its own in a relatively level orientation when it is not attached to tractor 10 or other vehicle. Adjustable stand 120 is preferably freed and locked back into place by a quick-release mechanism that does not require tools, such as a thumbscrew or a knob with a threaded shaft (not shown), to permit ease of operation. During operation adjustable stand 120 is moved upwards high enough to keep the bottom portion from contacting the layered material. Adjustable stand 120 preferably has a wide base 130 to distribute the weight of brooder guard plow 20 over a wider area, to avoid its sinking, e.g. into soft earth or sand, or damaging surfaces such as concrete or asphalt.

The lateral positions of turntable 70, guide apparatus 40, and adjustable stand 120 along the width of crossbar 100 can be adjusted by loosening the clamps 140 that hold these respective parts onto the crossbar. Alternatively, these parts can be permanently fixed into place, for example by welding, as shown for adjustable stand 120 in FIG. 2.

Figure 3:
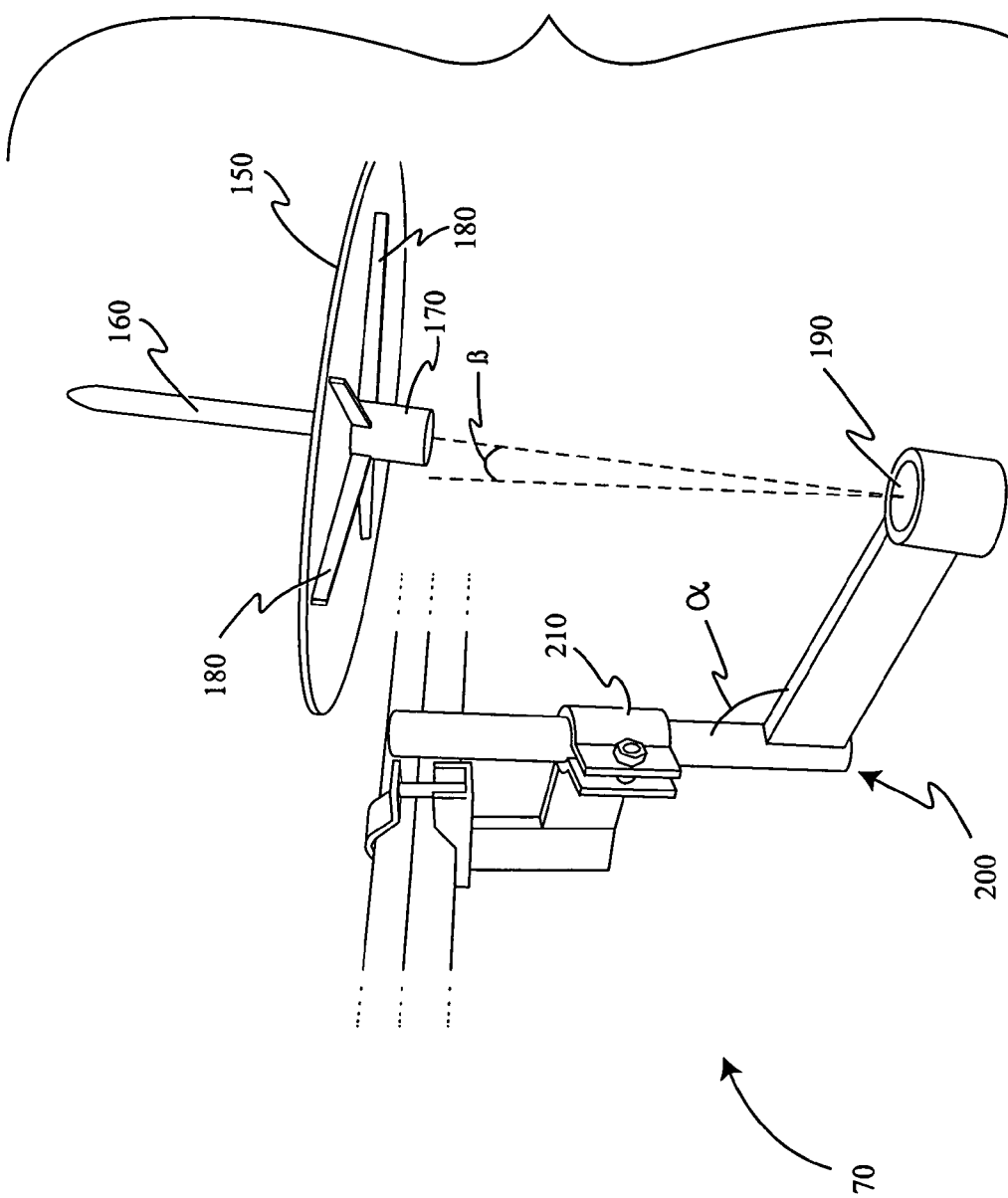
FIG. 3 is an isolation view of the turntable, showing the turntable floating above the arm that holds the turntable as well as a clamp that permits the height of the turntable to be adjusted.

Shown in FIG. 3 is a preferred embodiment of turntable 70, which supports roll 80 of barrier material 30 to be installed. In this embodiment turntable 70 consists of a flat, circular table surface 150 with a spindle 160 projecting from an upper surface and a stem 170 protruding from the opposite surface and an optional plurality of gussets 180 on the underside to strengthen table surface 150. Table surface 150 is preferably wide and strong enough to hold a complete roll 80 of barrier material 30 without having the outer portions of roll 80 slip off the sides. Thus the diameter of table surface 150 is preferably at least several inches larger than the diameter of a full roll 80 of barrier material 30. In one embodiment table surface 150 is thirty inches in diameter, which is sufficiently wide to hold a full roll of corrugated cardboard which initially contains 250 feet of material and is at least twenty-seven inches in diameter. The top of table surface 150 of turntable 70 is preferably smooth with no lip at the edge, in order to permit smooth feeding of barrier material 30 off turntable 70 and into guide apparatus 40.

Stem 170 fits into a hole 190 on a support arm 200, which in turn is attached to crossbar 100. To promote smoother turning of turntable 70 and hence smoother feeding of the material, the interface between stem 170 and hole 190 is greased. Smooth movement may also be obtained by installing ball bearings at this point of rotation. In other embodiments turntable 70 can also be stationary, provided that roll 80 of barrier material 30 is able to turn about the spindle smoothly enough to permit feeding of barrier material 30 into guide apparatus 40 as it is installed. Furthermore and as mentioned previously, barrier material 30 can be stored and fed into guide apparatus 40 by other means besides turntable 70 attached to the crossbar 100. For example another vehicle that contains barrier material 30 might move alongside the vehicle, e.g. tractor 10, that is driving guide apparatus 40.

The height of turntable 70 can be adjusted at a collar 210. Ideally the height of turntable 70 is high enough to ride above litter 60 while tractor 10 moves, without disturbing the layers of litter 60. Preferably the height of turntable 70 is adjusted so that barrier material 30 moves from roll 80 to guide apparatus 40 while remaining relatively flat and unruffled.

In a preferred embodiment turntable 70 is tilted relative to base surface 50 to reduce or eliminate the angle of bending that barrier material 30 must make before entering guide apparatus 40. In a preferred embodiment turntable 70 is tilted backwards (relative to tractor 10) as well as towards guide apparatus 40. The angle of tilt in one embodiment is between approximately 15° and 20° (relative to horizontal—see FIG. 3) and in a preferred embodiment is approximately 18°, both in the backwards direction (angle $\alpha$ in FIG. 3, which represents the 90° right angle of support arm 200 plus the 15°–20° of backwards tilt) as well as towards the side containing the guide apparatus (angle $\beta$ in FIG. 3 represents the 15°–20° tilt relative to a reference point that is approximately normal to base surface 50). In general the backward angle of tilt of turntable 70 should approximately match the angle of the downward slope of barrier material 30 as it moves through guide apparatus 40. The angle and length of guide apparatus 40, in turn, depend on the width and flexibility of the barrier material being installed, such that barrier material that is wider or less flexible will need a shallower, more gradual angle as it makes the transition from above to inside of or below the layered material.

The angle of tilt on turntable 70 can be set at a number of points, e.g. where the adjustable vertical portion of support arm 200 meets the horizontal part having hole 190 which holds stem 170 (angle $\alpha$ in FIG. 3) or by adjusting the clamp that holds the turntable assembly onto crossbar 100, if the cross-section of crossbar 100 permits such rotational movement. The backward tilt angle of turntable 70 can also be made to be adjustable by making the joint labeled with angle $\alpha$ in FIG. 3 a pivoting joint that can be adjusted and locked down. In a preferred embodiment the backward tilt angle is permanently set at the position labeled as angle $\alpha$ (FIG. 3) and the side tilt angle labeled $\beta$ is set by twisting the material to which turntable support hole 190 is attached (FIG. 3).

Figure 6A:
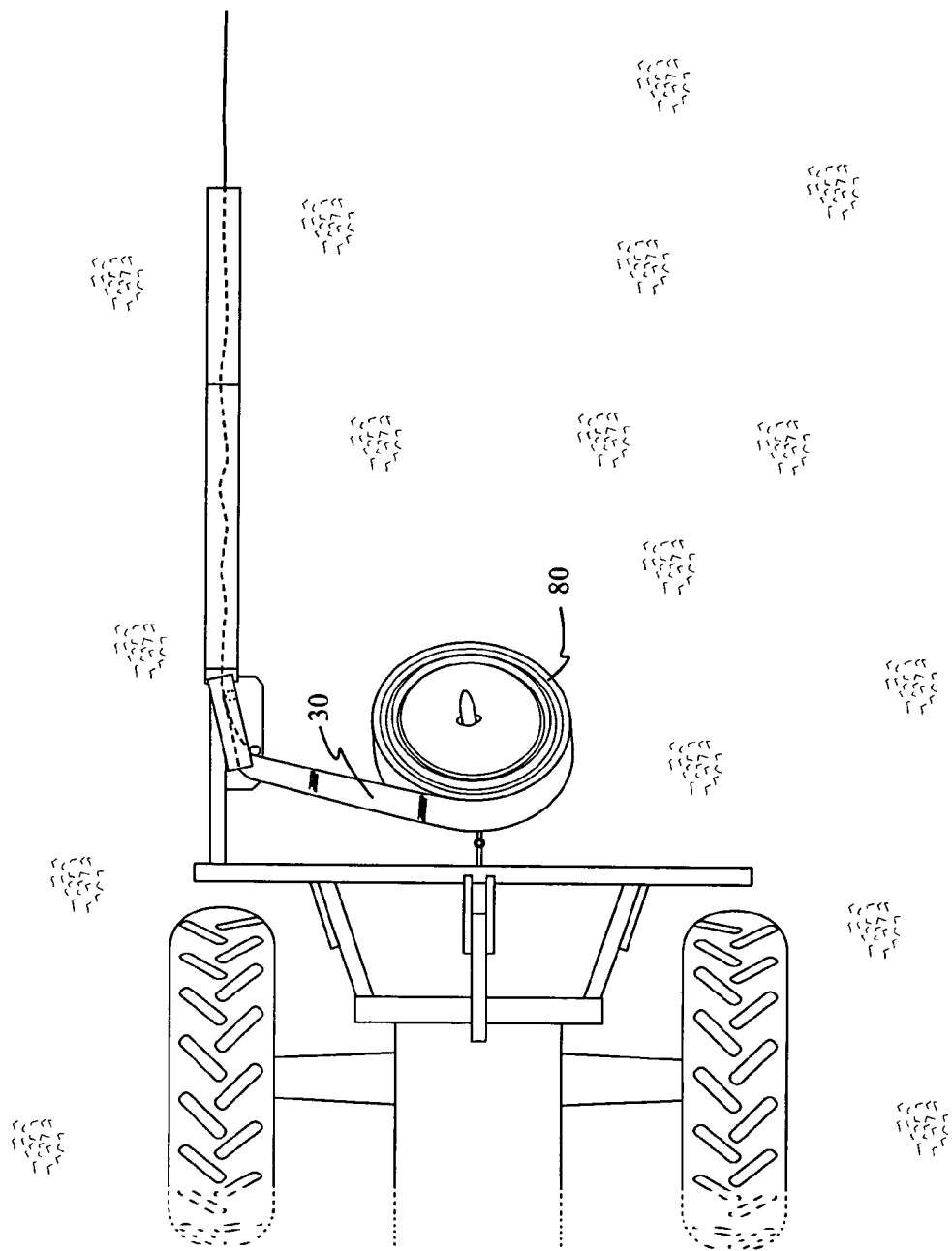
FIG. 6A shows a view from the top of one embodiment of the guide apparatus and turntable attached to a tractor being used to install barrier material from a roll into a layered material.
Figure 6B:
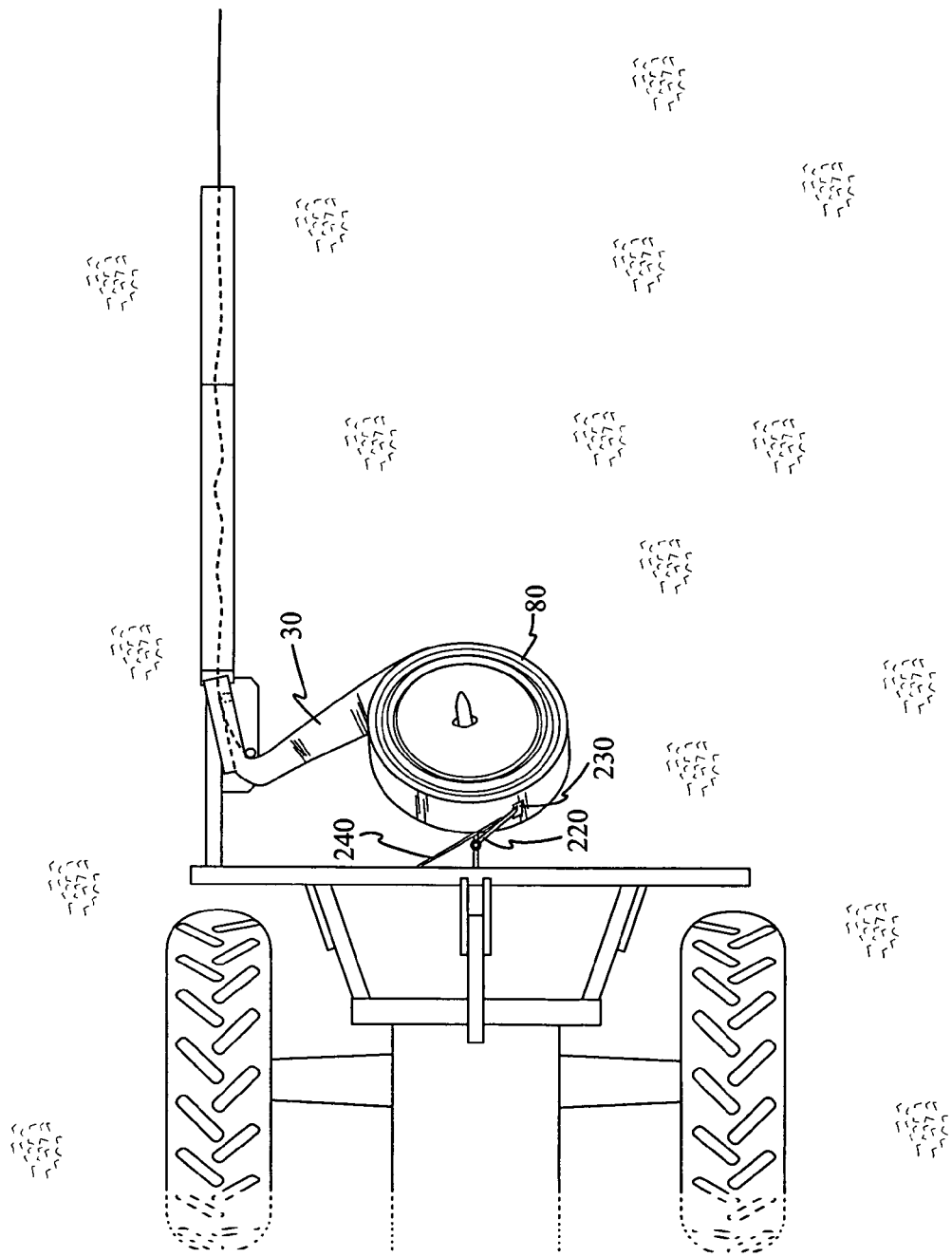
FIG. 6B shows the same general view as FIG. 6A but with the roll of material in the opposite orientation.

In one embodiment there is an optional tension bar 220 attached to the turntable which puts sufficient force on roll 80 of barrier material 30 to keep it from 'freewheeling', i.e. spinning faster than is warranted by the rate of material feeding and thus unwinding excess material (FIG. 6B). Tension bar 220 in one embodiment is pivotably attached to the vertically adjustable support bar of turntable 70 and consists of tension bar 220 with an optional flap 230 at the end that contacts the roll of barrier material. Flap 230 helps to more evenly distribute the force of tension bar 220 to avoid having the end of tension bar 220 tear barrier material 30. Tension bar 220 is held against roll 80 in one embodiment by action of a simple spring 240 attached to crossbar 100 (FIG. 6B). Tension bar 220 can be set on the left or right side of roll 80, depending on which direction roll 80 is mounted on turntable 70, with the attachment of spring 240 to crossbar 100 being switched to the opposite side.

Figure 4:
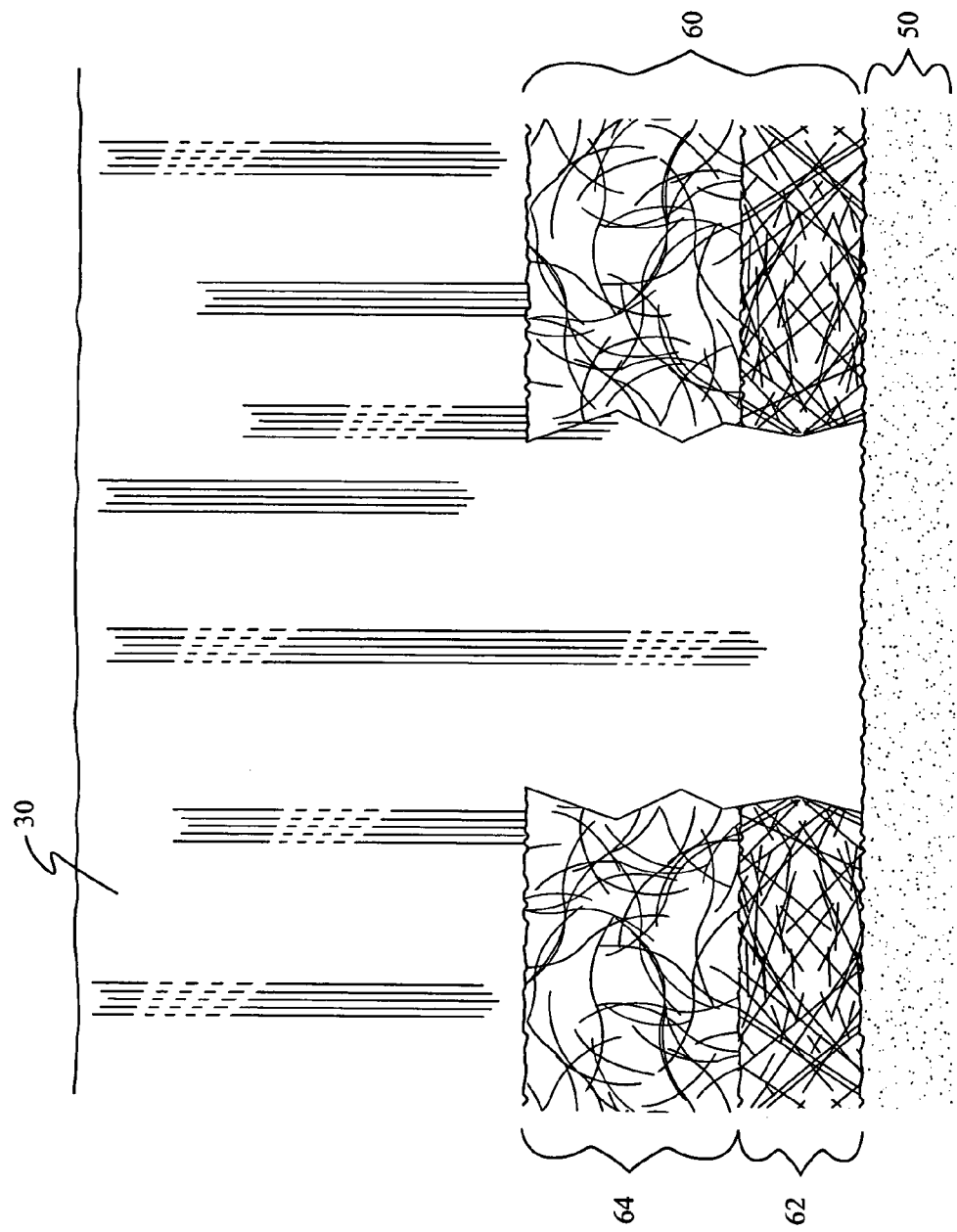
FIG. 4 shows a cross-section of the barrier material when installed into a layered material, with part of the layered material removed to permit viewing of the barrier material resting on the base surface.

FIG. 4 shows a cross-section of barrier material 30 after installation. In this view part of layered material 60 has been omitted to permit clear viewing of the installed barrier material 30 along its full height. At the bottom is base surface 50 upon which barrier material 30 rests; in one embodiment this is a concrete floor of a barn while in other embodiments this is a hard-packed earth surface. Above this base surface 50 in one embodiment is a layer of water-absorbent material 62, which in a preferred embodiment consists of a layer of rice hulls about two inches deep. This material is then overlaid with an upper layer of material 64 such as wood chips, wood shavings, straw, or some combination of materials in one or more layers. Upper layer 64 is generally deeper than lower layer 62 and in one embodiment upper layer 64 is six inches deep.

When barrier material 30 has been installed, the support generated by the surrounding layered material is usually sufficient to keep barrier material 30 upright. However, if necessary (and as appropriate given the nature of the base surface) stakes or posts may be added to keep the barrier material from falling or sagging.

Figure 5:
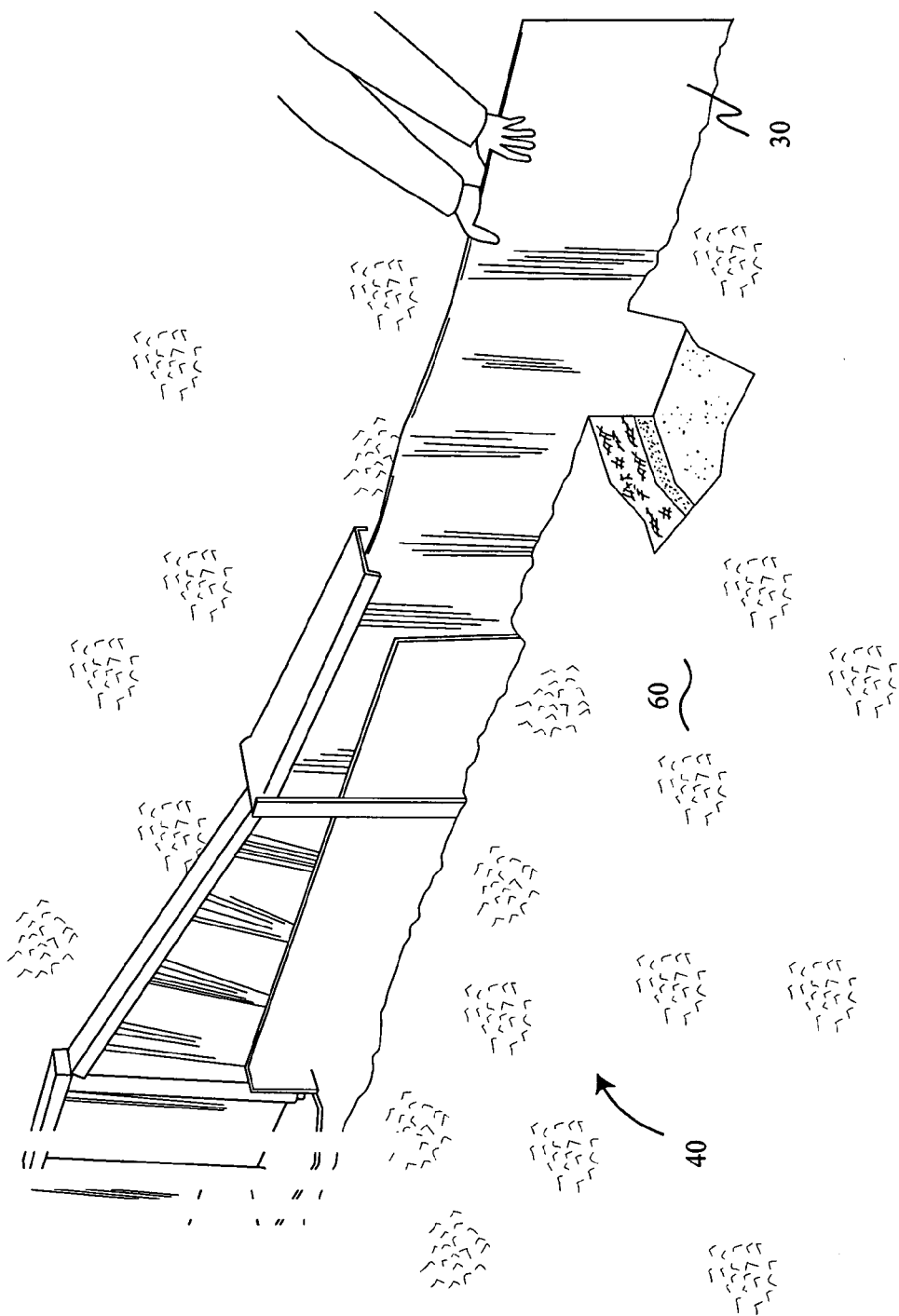
FIG. 5 shows the barrier material being installed, depicting one method for stabilizing the barrier at the beginning of a roll by holding the material manually in place.

FIG. 5 shows the installation of barrier material 30. Before installing barrier material 30, guide apparatus 40 is pulled by tractor 10 or other device as guide apparatus 40 is lowered, until guide apparatus 40 is at a desired height relative to base surface 50. Usually guide apparatus 40 is lowed until its bottom portion is resting on base surface 50. By driving guide apparatus 40 forward as it is lowered this minimizes disruption of layered material 60 as guide apparatus 40 is inserted therein. Also, in the case of denser layered materials it may be necessary to drive guide apparatus 40 forward while lowering in order to be able to penetrate layered material 60. By running guide apparatus 40 through layered material 60 for a short distance this creates a furrow into which the beginning portion of barrier material 30 may be fed when starting a new row.

Figure 7:
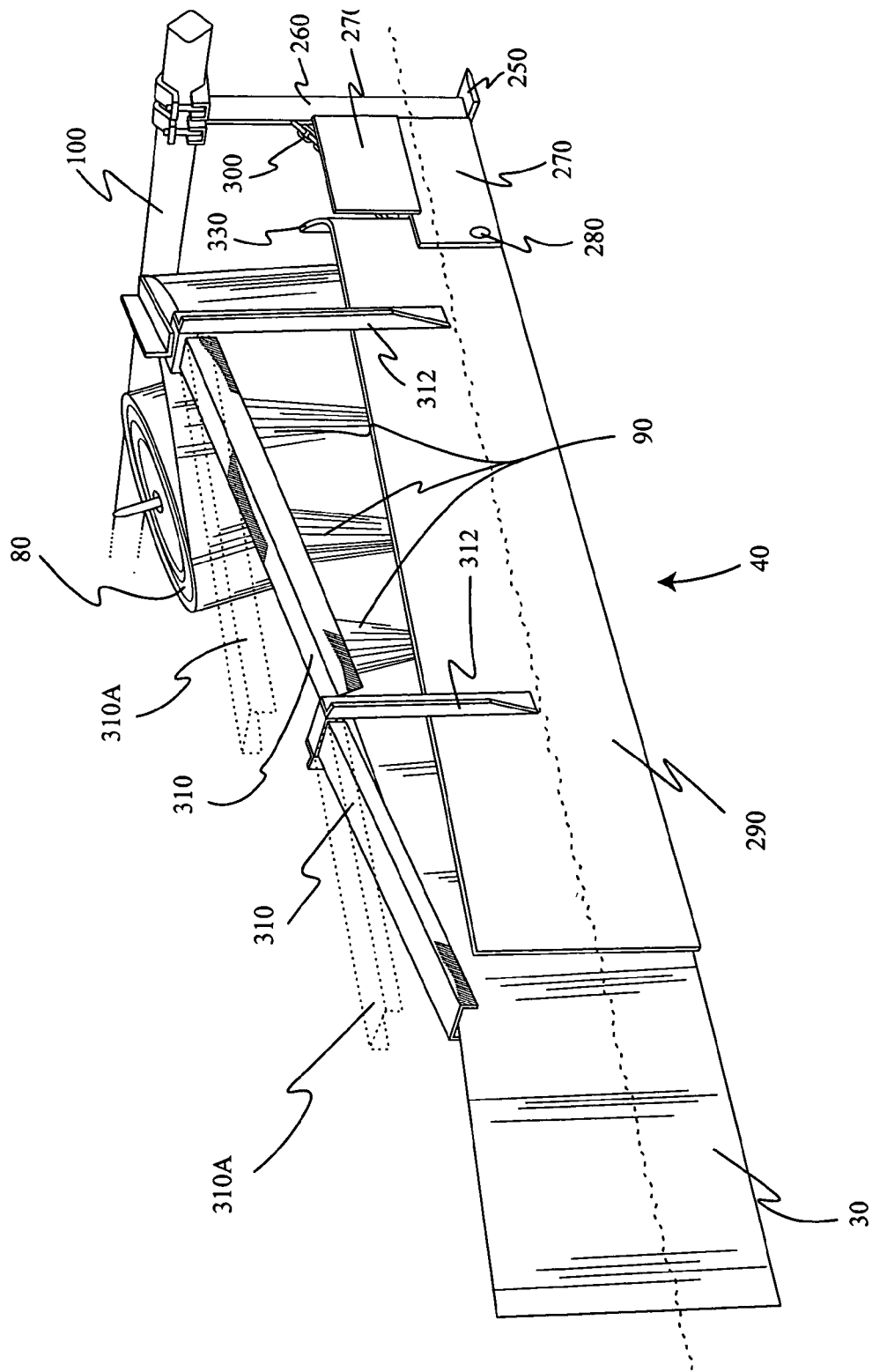
FIG. 7 shows another view of the installation of barrier material.

In one embodiment a skid plate 250 is attached to the underside of guide apparatus 40, preferably at or near the front end, to keep guide apparatus 40 resting on base surface 50 (and to prevent guide apparatus 40 from digging deeper, in the case of a base surface consisting of a softer material such as earth) and to prevent damage to the underside of the remainder of guide apparatus 40 (FIG. 7).

To install, barrier material 30 is manually fed through guide apparatus 40 until barrier material 30 protrudes from the back end of guide apparatus 40. In one embodiment a furrow is made in layered material 60 by hand, or other means besides movement of guide apparatus 40, to permit the beginning of barrier material 30 to be inserted. In another embodiment, as described above, guide apparatus 40 is run through layered material 60 for a short distance to create an initial furrow into which barrier material 30 may be manually inserted during initial setup.

The end of barrier material 30 is then held firmly in place while guide apparatus 40 is moved forward through layered material 60 (FIG. 5). Barrier material 30 may be held in place by hand (FIG. 5), or it may be staked, clamped, or weighted in place to allow a single person to install barrier material 30 without assistance. Guide apparatus 40 is then driven forward, guide apparatus 40 digging a narrow furrow or channel through layered material 60 as it advances and inserting barrier material 30 with minimal disruption of layered material 60. If barrier material 30 is fragile, as, for example, in one embodiment where it is corrugated cardboard, then guide apparatus 40 must be moved forward slowly so as to permit barrier material 30 to feed through guide apparatus 40 without tearing. After guide apparatus 40 passes a given point, layered material 60 generally falls back into place around the newly-inserted barrier material 30. In regions where two separate pieces of barrier material 30 meet such as where barrier material 30 has torn or a roll of material has ended, tape, clips, clothespins, or other fastening techniques may be used to join the barrier material pieces together.

The roll 80 of barrier material 30 may be placed on turntable 70 in one of two orientations (FIGS. 6A and 6B). Changing the orientation may be desirable if barrier material 30 has two different faces, so that a particular face (smooth or ridged, for example, in the case of corrugated cardboard) faces to the left or right as it is installed.

Figure 8:
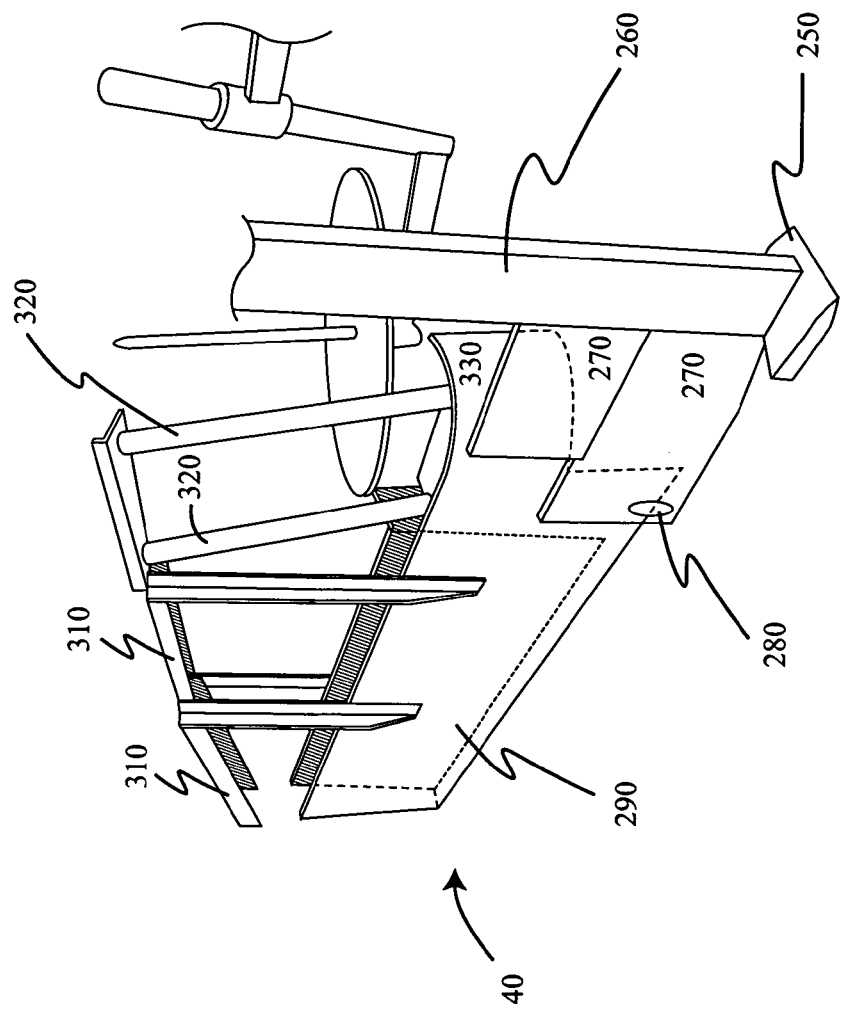
FIG. 8 shows the guide apparatus from the front without any barrier material present.

FIGS. 7 and 8 show different views of a preferred embodiment of guide apparatus 40 either with (FIG. 7) or without (FIG. 8) barrier material 30 present. At the front end guide apparatus 40 includes a vertical post 260 for attaching guide apparatus 40 to crossbar 100. In a preferred embodiment the bottom of vertical post 260 has attached to it skid plate 250, to keep guide apparatus 40 resting on base surface 50 (and to prevent the guide apparatus from digging deeper, in the case of a base surface consisting of a soft material such as earth) and to prevent damage to the underside of the remainder of guide apparatus 40 (FIG. 7). In one embodiment the front edge of vertical post 260 is rounded or has a triangular 'knife' edge to allow vertical post 260 to 'cut' through layered material 60 with a minimum of disruption of the layers.

Attached to vertical post 260 are one or more flat plates 270, preferably at least several inches higher than the anticipated level of layered material 60, which create a wall that prevents layered material 60 from falling into the path of the advancing guide apparatus 40 (FIG. 7). The front portion of guide apparatus 40 consisting of vertical post 260 and flat plates 270 is preferably attached by a hinge 280 to the rearward portion of guide apparatus 40, which rearward portion consists of a guide slot 290 and related components. This connection between the front and rear portions of guide apparatus 40 is preferably hinged so as to allow the rear portion to move up and down with the contours of base surface 50 on which barrier material 30 is being laid, even if tractor 10 or other vehicle moves up and down during installation. This allows the rear exit portion of guide slot 290 to remain in close contact with base surface 50 at all times, insuring that barrier material 30 is always inserted as close as is practical to base surface 50. Flat plates 270 attached to vertical post 260 are arranged with enough clearance to permit pivoting movement of the rear portion of guide apparatus 40 relative to the front portion without binding or other interference (FIGS. 7 and 8).

To limit the range of movement of the rear portion of guide apparatus 40, especially when the entire brooder guard plow 20 is lifted off base surface 50, one end of a chain 300 is attached to the vertical post and the other end of the chain is attached to part of the rear portion of the guide apparatus (see FIGS. 2, 7). The length of chain 300 is adjusted so that it becomes taut when vertical post 260 is lifted, such that the rear portion of guide apparatus 40 is lifted off of base surface 50 and not allowed to drag. In an embodiment wherein the bottom edge of flat plates 270 are approximately parallel to base surface 50, the rear portion of guide apparatus 40 angles downward slightly when the entire guide apparatus 40 has been lifted, chain 300 is taut, and no part of the rear portion is resting on base surface 50.

The rear portion of guide apparatus 40 consists of guide slot 290, one or more top caps 310, and optional rollers 320 and other guides to ensure smooth feeding of barrier material 30 (FIGS. 7 and 8). Guide slot 290 is preferably tapered with a solid bottom and solid walls (FIG. 8). The solid bottom and walls prevent layered material 60 from entering into and potentially clogging guide slot 290. The width and degree of taper of guide slot 290 depends on, among other factors, the width and flexibility of barrier material 30 and thus the degree of bending or ruffling needed to transition barrier material 30 to base surface 50, as well as relative density of layered material 60 (such as litter) through which guide apparatus 40 is driven. If the litter or other layered material 60 is relatively dense, then a narrower profile may be desired for the entire guide apparatus 40, in order to reduce the amount of force required to drive guide apparatus 40 through layered material 60. If guide slot 290 is made narrower, however, guide slot 290 may be made longer to give a greater transition length, so as to permit barrier material 30 to make the transition with smaller ruffles 90 and thus be able to fit in the narrower guide slot 290.

The inside portion of guide slot 290 is preferably relatively smooth and free of rough edges to prevent barrier material 30 from catching and possibly tearing as it is fed through. The walls are preferably at least several inches higher than the highest anticipated level of layered material 60, to prevent layered material 60 from falling into guide slot 290. In one embodiment at least some part of the upper portion above guide slot 290 is left open to permit manual feeding and unjamming of barrier material 30 in guide slot 290 (FIGS. 7 & 8).

The base of guide slot 290 in one embodiment is approximately two inches wide, and the walls are tapered outward towards the top so that the distance between the walls at the top is several inches wider (FIGS. 7 and 8). Guide slot 290 is tapered so that the bottom portion has a smaller profile, to reduce disruption of layered material 60, while still allowing the upper portion of barrier material 30 to bend or ruffle as it is fed through guide slot 290. In one embodiment the front edge of the outer wall of guide slot 290 has an inward curve 330, preferably just near the top, to help guide barrier material 30 into guide slot 290 (FIG. 8).

Near the front end of guide slot 290 is preferably a platform 340 and one or more rollers 320 that help smoothly guide barrier material 30 into guide slot 290 (FIG. 1). Rollers 320 may be simply smooth and rounded but stationary surfaces, or rollers 320 may rotate with bearings to permit ease of rotation. To help push and guide barrier material 30 downward there are preferably one or more hinged and weighted caps 310 above guide slot 290. Caps 310 are preferably hinged at the front end (dashed line images of caps 310A in FIG. 7 indicate direction of motion and point of pivot), to allow a steady pushing force to be applied to barrier material 30 as it undergoes the bending that is necessary during the transition into layered material 60. In one embodiment caps 310 are made of steel, such that the weight of the material itself provides sufficient downward force on barrier material 30. In other embodiments caps 310 are spring-loaded, using methods that are well known in the art, to generate downward force. Caps 310 are preferably elongated channels with a lip on either side, so that cap 310 helps to guide and stabilize the upper edge of barrier material 30 as it passes through guide slot 290 inducing ruffles 90 (FIG. 7).

The hinged ends of caps 310 are supported at heights sufficiently high above guide slot 290 to permit barrier material 30 to make a gradual transition from where barrier material 30 enters guide apparatus 40, roughly at the level of turntable 70, until barrier material 30 reaches the rear end of guide slot 290 and is deposited with its lower surface at approximately the level of base surface 50. The posts 312 that support caps 310, as well as any other portion of guide apparatus 40, are designed to have a relatively flat profile so as to prevent disruption of layered material 60 that might occur if any parts of guide apparatus 40 protruded from the sides.

As barrier material 30 leaves roll 80 the bottom edge contacts platform 340 of guide apparatus 40 and the entire width of barrier material 30 contacts rollers 320 (FIG. 1). As barrier material 30 moves through guide apparatus 40, barrier material 30 is only supported on its bottom edge by the small platform 340 near the front of guide apparatus 40 (FIG. 1). After moving past platform 340, barrier material 30 is no longer supported on its bottom edge until barrier material 30 nears the rear end of guide slot 290. In the intervening space the lower edge of barrier material 30 is unsupported. The lack of support on the lower edge, plus the downward-pushing force of the cap(s), forces barrier material 30 downward, generating ruffles 90, and thus aids in forcing barrier material 30 to be parallel to and at the level of base surface 50 (FIGS. 1, 5, and 7).

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A guide apparatus for guiding a barrier material into a layered material, said guide apparatus comprising:
   a guide slot having solid walls; and
   at least one cap, positioned over said guide slot and arranged to generate downward force on said barrier material as said barrier material is guided through said guide slot.

2. The guide apparatus of claim 1, further comprising a front portion, said front portion comprising:
   a vertical support post having a bottom end and a top end;
   at least one lateral plate, said plate attached to said vertical support post and hingedly attached to said guide slot.

3. The guide apparatus of claim 2, wherein said vertical support post further comprises a skid plate attached to said bottom end.

4. The guide apparatus of claim 2, further comprising a crossbar attached to said top end of said vertical support post.

5. The guide apparatus of claim 4, further comprising a turntable attached to said crossbar.

6. The guide apparatus of claim 5, wherein said turntable is tilted backwards and sideways.

7. The guide apparatus of claim 1, wherein said guide slot is tapered in a vertical direction.

8. The guide apparatus of claim 1, wherein said cap is hingedly connected to said guide apparatus.

9. The guide apparatus of claim 1, wherein said barrier material is cardboard.

10. The guide apparatus of claim 1, wherein said guide slot has a solid bottom.

11. The guide apparatus of claim 1, wherein said cap comprises an elongated channel with a lip on either edge, said lips facing downwards.

12. A method of inserting a barrier material into a layered material, comprising the steps of:
    providing a guide apparatus comprising:
       a guide slot having solid walls and an open rear portion; and
       at least one cap, positioned over said guide slot and arranged to generate downward force on said barrier material as said barrier material is guided through said guide slot;
    advancing said guide apparatus through said layered material;
    guiding said barrier material through said guide slot; and
    extruding said barrier material through said open rear portion of said guide apparatus into said layered material.

13. The method of claim 12 wherein said advancing said guide apparatus through said layered material further comprises:
    creating a furrow in said layered material.

14. The method of claim 12 wherein said providing said guide apparatus further comprises:
    providing a turntable on which said barrier material is stored.

15. The method of claim 12 wherein said guiding said barrier material through said guide slot further comprises:
    generating downward pushing force on said barrier material with said cap.

16. A farm implement for guiding a barrier material into a layered material, said farm implement comprising:
    a turntable for holding said barrier material;
    a guide apparatus for guiding said barrier material into said layered material, said guide apparatus comprising:
       a vertical support post;
       a guide slot hingedly attached to said vertical support post;
       a platform and at least one roller attached to said guide slot; and
       at least one cap hingedly attached to and positioned above said guide slot; and
    a crossbar to which is attached said turntable and said vertical support post of said guide apparatus, said crossbar further comprising a hitch portion for attaching said crossbar to a vehicle.

17. The farm implement of claim 16 wherein said cap further comprises an elongated channel with a lip portion on either edge, said lip portions facing downwards.

18. The farm implement of claim 16 wherein said vertical support post further comprises a skid plate at a bottom end.

19. The farm implement of claim 16 wherein said guide slot is tapered and narrower at a bottom end, said bottom of said guide slot being solid.

20. The farm implement of claim 16 further comprising a support stand attached to said crossbar.

21. The farm implement of claim 16 wherein said turntable further comprises a tension bar for controlling rotational speed of said turntable.

* * * * *